United States Patent
Heikkinen et al.

(10) Patent No.: US 9,623,332 B2
(45) Date of Patent: *Apr. 18, 2017

(54) METHOD AND DEVICE FOR AUGMENTED REALITY MESSAGE HIDING AND REVEALING

(71) Applicant: Nokia Technologies Oy, Espoo (FI)

(72) Inventors: Mikko O. Heikkinen, Tampere (FI);
Kai Havukainen, Lempaala (FI);
Jukka Antero Holm, Tampere (FI);
Antti Johannes Eronen, Tampere (FI);
Timo Kosonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 40 days.

This patent is subject to a terminal disclaimer.

(21) Appl. No.: 14/573,010

(22) Filed: Dec. 17, 2014

(65) Prior Publication Data

US 2015/0104061 A1    Apr. 16, 2015

Related U.S. Application Data

(63) Continuation of application No. 11/194,129, filed on Jul. 29, 2005, now Pat. No. 8,933,889.

(51) Int. Cl.
*G06K 9/00* (2006.01)
*A63F 13/52* (2014.01)
(Continued)

(52) U.S. Cl.
CPC ............ *A63F 13/52* (2014.09); *A63F 13/213* (2014.09); *A63F 13/235* (2014.09);
(Continued)

(58) Field of Classification Search
None
See application file for complete search history.

(56) References Cited

U.S. PATENT DOCUMENTS 5,734,752 A    3/1998   Knox
6,094,483 A    7/2000   Fridrich et al.
(Continued)

OTHER PUBLICATIONS www.geocaching.com; retrieved from the Internet on Nov. 2, 2005, this reference was filed with parent U.S. Appl. No. US11/194,129.
(Continued)

*Primary Examiner* — Randolph I Chu
(74) *Attorney, Agent, or Firm* — Ditthavong & Steiner, P.C.

(57) ABSTRACT

The present invention relates to an operation method for executing games on mobile camera enabled terminal devices and to devices capable of executing the method. The method is based on hiding augmented reality messages in pictures by taking an image of an object, providing symbols; linking the symbols to the image, such that the symbols are not visible when displaying the image, and sending the image and the linked invisible symbols via a wireless connection as a first image to a mobile camera terminal device. The invention also provides a second component to re-visualize the hidden message by receiving the first image, taking a second image with a camera of the mobile camera terminal device, displaying the second image, comparing the first and second images to determine a matching measure, and visibly displaying the linked invisible symbols on the display, if the comparison fulfills at least one predetermined condition.

20 Claims, 6 Drawing Sheets

(51) Int. Cl.

| | | |
|---|---|---|
| *A63F 13/213* | (2014.01) | |
| *A63F 13/235* | (2014.01) | |
| *A63F 13/332* | (2014.01) | |
| *G09G 5/373* | (2006.01) | |
| *H04M 1/725* | (2006.01) | |
| *A63F 13/34* | (2014.01) | |
| *A63F 13/65* | (2014.01) | |
| *A63F 13/69* | (2014.01) | |
| *G06T 1/00* | (2006.01) | |
| *H04N 1/32* | (2006.01) | |

(52) U.S. Cl.
CPC ........... *A63F 13/332* (2014.09); *A63F 13/34* (2014.09); *A63F 13/65* (2014.09); *A63F 13/69* (2014.09); *G06T 1/0021* (2013.01); *G09G 5/373* (2013.01); *H04M 1/72544* (2013.01); *H04M 1/72555* (2013.01); *H04N 1/32267* (2013.01); *H04N 1/32352* (2013.01); *A63F 2300/1093* (2013.01); *A63F 2300/406* (2013.01); *A63F 2300/5506* (2013.01); *A63F 2300/609* (2013.01); *G09G 2340/12* (2013.01)

(56) References Cited

U.S. PATENT DOCUMENTS

| | | | |
|---|---|---|---|
| 6,356,363 | B1 | 3/2002 | Cooper et al. |
| 6,358,596 | B1 * | 3/2002 | Mehta ................... D21H 21/40 |
| | | | 428/172 |
| 6,504,941 | B2 | 1/2003 | Wong |
| 6,704,027 | B2 | 3/2004 | Nakano |
| 6,851,052 | B1 | 2/2005 | Graveman |
| 7,002,551 | B2 | 2/2006 | Azuma et al. |
| 7,095,873 | B2 | 8/2006 | Venkatesan et al. |
| 7,337,321 | B2 | 2/2008 | Terada et al. |
| 7,386,159 | B2 | 6/2008 | Handley et al. |
| 7,663,670 | B1 | 2/2010 | Oroubadian |
| 7,737,965 | B2 | 6/2010 | Alter et al. |
| 8,090,141 | B2 | 1/2012 | Eschbach et al. |
| 8,447,067 | B2 | 5/2013 | Rhoads et al. |
| 2003/0016842 | A1 | 1/2003 | Patton et al. |
| 2003/0033530 | A1 | 2/2003 | Sharma et al. |
| 2003/0068067 | A1 | 4/2003 | Fielding et al. |
| 2003/0117584 | A1 | 6/2003 | Revelli, Jr. et al. |
| 2003/0191941 | A1 | 10/2003 | Terada et al. |
| 2003/0231785 | A1 | 12/2003 | Rhoads et al. |
| 2004/0001605 | A1 | 1/2004 | Venkatesan et al. |
| 2004/0001606 | A1 | 1/2004 | Levy |
| 2004/0051680 | A1 | 3/2004 | Azuma et al. |
| 2004/0185885 | A1 | 9/2004 | Kock |
| 2004/0250079 | A1 | 12/2004 | Kalker et al. |
| 2005/0027600 | A1 | 2/2005 | Phillips |
| 2005/0141750 | A1 | 6/2005 | Rhoads et al. |
| 2005/0248668 | A1 | 11/2005 | Machida |
| 2005/0251030 | A1 | 11/2005 | Azar et al. |
| 2005/0259820 | A1 | 11/2005 | Jones |
| 2005/0280720 | A1 | 12/2005 | Kwon et al. |
| 2006/0005029 | A1 * | 1/2006 | Petrovic ................. G06F 21/10 |
| | | | 713/176 |
| 2006/0115082 | A1 | 6/2006 | Kevenaar et al. |
| 2006/0212705 | A1 | 9/2006 | Thommana et al. |
| 2006/0215242 | A1 | 9/2006 | Besharat et al. |
| 2006/0252455 | A1 | 11/2006 | Van Stuivenberg et al. |
| 2007/0004461 | A1 | 1/2007 | Bathina et al. |
| 2007/0035562 | A1 | 2/2007 | Azuma et al. |
| 2007/0171288 | A1 | 7/2007 | Inoue et al. |
| 2007/0177759 | A1 | 8/2007 | Eschbach et al. |
| 2009/0293012 | A1 | 11/2009 | Alter et al. |
| 2015/0025628 | A1 * | 1/2015 | Langer ................... A61F 2/52 |
| | | | 623/8 |

OTHER PUBLICATIONS http://0.tecmo.jp/index.shtml; retrieved from the Internet on Nov. 2, 2005, this reference was filed with parent U.S. Appl. No. 11/194,129.

www.ojom.com/produces/mosquitos.html; retrieved from the Internet on Nov. 2, 2005, this reference was filed with parent U.S. Appl. No. 11/194,129.

www.ojom.com/produces/killer_virus.html; retrieved from the Internet on Nov. 2, 2005, this reference was filed with parent U.S. Appl. No. 11/194,129.

www.sysopendigia.com/C2256FEF0043E9C1/0/405000126; retrieved from the Internet on Nov. 2, 2005, this reference was filed with parent U.S. Appl. No. 11/194,129.

www.eyetoy.comlindex.asp; retrieved from the Internet on Nov. 2, 2005, this reference was filed with parent U.S. Appl. No. 11/194,129.

Sverdlov et al., "Robust DCT-SVD Domain Image Watermarking for Copyright Protection: Embedding Data in All Frequencies," submitted to Multimedia Computing and Networking 2005 Conference, San Jose, CA, Jan. 16-20, 2005, this reference was filed with parent U.S. Appl. No. 11/194,129.

Mohanty, "Digital Watermarking : A Tutorial Review", retrieved from http://informatika.stei.itb.ac.id/~rinaldi.munir/Kriptografi/WMSurvey1999Mohanty.pdf on Mar. 13, 2015, 1999, 24 pages, this reference was filed with parent U.S. Appl. No. 11/194,129.

* cited by examiner

METHOD AND DEVICE FOR AUGMENTED REALITY MESSAGE HIDING AND REVEALING

CROSS-REFERENCE TO RELATED APPLICATION

This application is a continuation of U.S. patent application Ser. No. 11/194,129, filed Jul. 29, 2005, entitled "Method and Device for Augmented Reality Message Hiding and Revealing", which is incorporated herein by reference in its entirety

TECHNICAL FIELD

The present invention relates to an operation method for executing games on mobile camera enabled terminal devices. The present invention may also be used for hiding messages in bitmaps. The present invention is also related to mobile games, messaging, and augmented reality.

STATE OF THE ART

The present invention refers to a game that is somewhat similar to a game called Geocaching. Geocaching is a "real life adventure game" for users of GPS (Global Positioning System) devices. The basic idea is that individuals set up caches all over the world and spread the locations of these caches via Internet. The GPS users can then use the coordinates of the caches for "rough navigation" to an area where a cache can be found. The word Geocaching is composed of GEO for geography, and CACHING for hiding a cache. Once found, a cache may provide the visitor with a wide variety of items as reward. Each visitor is asked to put something into the cache.

The cacheur (one who finds or looks for a cache) should also sign a visitors' book of the cache. Larger caches may consist of waterproof plastic buckets placed unobtrusively in the environment. The cache may contain the guest book and a number of more or less valuable items, which can turn the game into a true treasure hunt. The location of a cache may demonstrate the skill or even daring of the person who has laid out the cache. For example, a cache located on the side of a high bridge or a tree accessible only with rock climbing equipment may be hard to find. For more information, see http://www.geocaching.com.

Augmented reality is an area of virtual reality research. The basic idea behind augmented reality is to mix reality with virtual reality. So instead of generating an entire synthetic universe like in virtual reality, graphics, audio, and other sense enhancements are superimposed over a real-world environment to create an augmented reality environment. Augmented reality is closer to the real world than virtual reality because it adds elements to the natural world, as it exists. Augmented reality is sometimes also referred to as mixed reality.

Proposed application domains for augmented reality are, e.g., medical applications, entertainment, military training, engineering design, and consumer design. An example of a medical application is image-guided surgery, where, e.g., a surgeon can see magnetic resonance imaging (MRI) data correctly registered on the patient during an operation. A familiar example of augmented reality are television weather reports where the weather reporter seems to be standing in front of changing weather maps that are actually computer generated images. Augmented advertisements are sometimes used in TV broadcasts of, e.g., football games, where they are drawn virtually on top of special panels around the playing field. Also in ski jump broadcasts, typically one of the cameras also shows an augmented red line showing the length of leading jump. Augmented reality helped to the popularity of Americas Cup Sailboat racing contests to visualize the actual positions of boats in relation to each other and the wind on a plane water surface. Some gaming applications that use augmented reality are presented in the next chapter.

An augmented reality system can comprise of, e.g., the following elements: see through display, sensors that provide tracking information of user's limb- and, e.g., eye movements, haptics hardware that provides tactile feedback, audio hardware, and a small wearable central processing unit. See-through head mounted displays (HMDs) are often used and commercially available. However, an augmented system does not have to have all the components described here.

For example video games based on use of real world video or still images are known. The following games use augmented animations in connection with video streams and/or still image.

At the moment there are some applications that use augmented reality in games. Actual forms of augmented reality games are for example the game "REAL" (Reveal, Enclose, Appear Let's shoot) from tecmo (see: http://0.tecmo.jp/index.shtml), the game "Mosquitos" (http://www.ojom.com/g_mosquito.html) and the game "Attack of the Killer Virus" (http://www.ojom.com/g_killer_virus.html) both from OJOM, and the game "Monsterhunt" (see http://www.sysopendigia.com/C2256FEF0043E9C1/0/405000126) from SysOpen Digia plc.

All these games are based on the "optical mouse principle", by detecting motions of the background for directing a cursor (or in this case the background) on a see-through game board that is superimposed to the background image currently taken from a video camera of game phones. The game idea is based on a simple shooting game in the "real" environment while only in the display (scope/sight) of a device the targets (monsters, ghosts, virus, and mosquitoes) are visible. In the display a crosshair is shown serving to aim a kind of "gun" at the targets.

Tecmo's game "Real" (2004) uses the idea that ghosts may be photographed. The player takes a picture and the game generates the shape of a ghost somewhere to the background of the picture. The player must then attempt to shoot the ghost through the camera.

In "Attack of the Killer Virus" and "Mosquitos" for Symbian S60 mobile phones these games may be interpreted as "Augmented Reality—shoot 'em ups". In both games, the objects the player must shoot are superimposed on top of a live video stream from the camera of the mobile phone. Other similar games include at least "MonsterHunt" and "Agent V" from Digia Software for certain Nokia mobile phone models. All these games use live video stream to recognize how the phone is moved.

Another augmented reality game is the EyeToy from Sony used in connection with a Playstation 2. The EyeToy provides a kind of "fixed target suppression" using all components of successive frames with a changing signal as an event input. EyeToy also uses a see-through game board in which a player can see his movements in relation to the elements on the game area. Various "EyeToy" games have been very popular since they were first introduced in 2003. The player places himself in front of a television set and a small video camera connected to the game console. A picture of the player is shown on the television screen in real-time and placed "inside" the game environment through layered graphics. The game recognizes player's movements and these are used for controlling the game. There are several innovative "EyeToy" mini-games: For instance, in "Keep Ups" game, the player must bounce a virtual football with his head and other body parts. In "AirGuitar", a virtual electric guitar is superimposed in front of the player. The game recognizes the position of player's left hand on the virtual fingerboard and the movement of right hand strumming (see http://www.eyetoy.com).

It is also known to use watermarking techniques in imaging see, e.g., the Internet on pages "http://www.sci.brooklyn.cuny.edu/~eskicioglu/papers/EUSIPCO2005-WM.pdf" or "http://www.cs.unt.edu/~smohanty/research/Reports/MohantyWatermarkingSurvey1999.pdf"

All the known games provide video gaming in front of a real and currently video filmed background, relying on movements of or in the background as a main input component. Due to the similar game ideas these games are in danger of becoming only a kind of theme with variations of the same game idea, so that the following games such as "Cockroach Kill", "Bedbug Blast", "Gadfly Slay", "Hornet Swat", or "Jumping Snail !uash" may be expected in near future. Additionally, all these games suffer mainly from the same background in the game, i.e. the usual interior of a known environment such as the living room.

In all known games, there is actually no need for augmented reality, as there is no interaction between the content of the background (except, e.g., a white wall) and the game itself, basically all games just use the background only for recognizing scrolling movements.

Therefore, it is desirable to have a new game functionality that can be played on mobile camera telephones.

It is also desirable to have a new implementation of methods to execute or operate games on camera cell phones to promote user creativity and that may also serve as a reason for outdoor exercise.

It is therefore desirable to have a new way of using augmented reality in mobile applications for camera enabled devices such as, e.g., camera phones, smart cams, smart phones, PDAs and or smart navigation systems.

It is also desirable to provide new usage for mobile telephones as an additional feature to stimulate users to buy new cellular phones.

SUMMARY OF THE PRESENT INVENTION

The present invention deals with the idea to hide a text message in an image that is presented to the user in a game. The user has to find the place where the image was taken and take the same image with his camera or point the viewfinder in that location. If the viewfinder image matches the reference image, the text message is shown to the user.

According to a first aspect of the present invention, there is provided a method for augmented reality message hiding, comprising taking an image of an object, providing symbols and linking said symbols to said image, such that said symbols are not visible when displaying the image.

The said image and said linked invisible symbols are then sent via a wireless connection as a source image or a first image to a mobile camera terminal device.

The symbols may be in the simplest case a set of characters forming one or more words or sentences. Anyhow, the symbols may also comprise icons, signs, trademarks or other well-known graphic elements such as arrows that are able to indicate some kind of interpretable information. However, the symbols or graphic elements need not to be interpretable, so it may be possible to provide graffiti style ornaments to walls or the "usual decoration" like black teeth, moustaches, glasses, or horns to election posters or portraits of teachers, or the like.

By sending said image and said linked invisible symbols via a wireless connection as a source image to a mobile camera terminal device, a target with a hidden information may become available for, e.g., a game partner.

The invention describes a new way to hide messages in an augmented reality environment. A person selects some location or object, takes a photo of it, "hides" a text message to it using another image layer, and sends the original image and the hidden message to his friend using, e.g., a MMS message. The linking of the symbols to the symbols should be performed in a manner where it is difficult to extract the symbol in another way other than the intended way. The mission of the receiving person is to find that exact location or a similar object, and point to the location or object with the terminal camera. When the camera input is close enough to the original image, the hidden message is shown on the screen/display.

The game idea is that of a "paper chase" or that of a "scavenger hunt" without the necessity to actually lay traces. Paper chase is a children's game where a first group hides a first message on a starting point with a first route point, where the next piece of paper indicates the next route point. At the route points the traces are hidden so that the time to find the hint to the new route point approximately equalizes the time required to write and hide the piece of paper. The children's game scavenger hunt is based on a task list with the task to collect a number of (estimably ownerless) items in the environment such as, e.g., three leaves of a beech-tree, a crown cap, two acorns, a flat stone, a white round stone, a snail-shell, a piece of wire and a fir cone.

In an example embodiment said image and said linked invisible symbols are sent as a multi media message (MMS) via a cellular telephone communication network. That is, the first source image may be sent as an MMS via, e.g., a GSM network, or as an MMS via an UMTS network. It is also envisaged to transfer an executable program together with the first or source image to access said hidden symbols or message. It is also contemplated to use WLAN (wireless local area network) or WWAN (wireless wide area network) structures to transfer said first pictures, e.g., for teambuilding measures in Intranets. The invention may also be used to implement a "visual handbook" or "visual repair instructions", for training mechanics.

In yet another example embodiment the method of the present invention further comprises defining regions of interest in said first image or source image, and linking information related to said regions of interest to said image. By using regions of interest "must match areas", etc., and/or "must not match areas" (e.g., marked by a manufacturer logo, copyright sign or, e.g., an icon of an animal) may be implemented in the first picture. In every image/picture there are variable components, such as lighting, moving objects, such as animals, plants, people or, e.g., cars. It is possible to increase the functionality of the matching algorithm by excluding probably non-matching areas in the first image from the matching algorithm.

Another example embodiment of the method of the present invention further comprises preprocessing/post-processing, enhancement operations, color processing or, generating a virtual scene from said image taken. The taking of the image may include taking/recording a video stream or a number of images, pre-/post-processing, enhancement operations, and color processing. Generating a virtual scene from said image taken, especially the use of virtual scenes (e.g., in combination with a transferred hidden real image serving as the object for comparison), may reduce the possibility for cheating. The information a player needs is the position from which position and in which direction the image has been taken, this may also be achieved with a virtual scene. Virtual scenes have the additional advantage that the amount of data required to transfer the virtual scene may be drastically reduced (using restricted numbers colors or, e.g., data compression techniques).

Image processing may be used to compensate different lighting conditions that may pose a problem for the system. However, there are methods to calculate image similarity despite different lighting conditions, e.g., by using color-normalized images. It may be possible to use a number of images (taken, e.g., every half an hour during a 24 hour interval) and use region or contour matching only at the "all time light regions" or "all time visible regions" of a images, or of an averaged image, generated from a combination of the number of images. In such an embodiment the method would also comprise the steps of taking a number of images, and generating a source image from said images. However in a simpler version of the invention, the first image may just be a certain color in an "I spy with my little eye" fashion. "I spy with my little eye" is a children's game where one child states that it can see some object (another is probably not aware or) of a certain shape or a certain color. In the game another child tries to identify the object by questions that may more clearly define other properties of the object in question (such as, e.g., a number of feet). The game ends if a child can identify the object. In this case the lighting conditions do matter and the player must seek for proper light and color to be able to solve the task or make a match. Thus, it may also be an element of the method to force a participant to photograph the desired location as close to the original as possible such as the Sanctuary of the temple of Abu Simbel at morning of February 21 and October 21.

In yet another example embodiment of the present invention watermarking techniques are used to perform said linking of said symbols to said image in a way that said symbols are not visible when displaying the image. For example image watermarking techniques could be used to hide the symbols or the message. That is, the symbols, the message or the image containing the hidden message text is embedded as an invisible, robust watermark into the first or source image sent to the player. It is not possible or at least very difficult to detect an invisible watermark by hand. The watermarking may only be used in environments with a non-zero cheating probability.

The game application may be provided with a code to extract an embedded watermark. This could be implemented as a piece of program code in the game software. However, it may also be contemplated to use a dedicated firmware updateable watermark module. When the mobile camera terminal device is pointed at a supposed location, the mobile camera terminal device can recognize that there is a match, and will extract the watermark from the received reference image, and superimpose the extracted watermark image on the image from the camera.

Watermarks may be used to prevent cheating by presenting the camera, e.g., a print from the first image. A robust Watermark could even survive little modifications, so that when the mobile camera terminal device detects matching watermarks the original image may be deleted immediately.

Another example embodiment of said linking of said symbols to said image further comprises defining a position of said symbols in relation to said first image. It is envisaged to define also a font, a font size, a color a position and/or an orientation of the symbols in the first image. The position of the symbols may be defined in relation to certain pixels in the (first) image (in case a pixel matching algorithm is expected to be used for revealing the symbols), in relation to regions (in case a region matching algorithm is expected), in relation to shapes (in case a shape counting matching algorithm is expected to be used) or in relation to any combination thereof. This embodiment may also comprise the transmission of the defined fonts, font sizes, colors, positions, and/or orientations of the symbols (in a linked, encoded or non-coded manner).

According to another aspect of the present invention, a method for displaying hidden augmented reality messages on a mobile camera terminal device is presented. The method comprises receiving a first image or source image with linked invisible symbols via a wireless connection at a mobile camera terminal device. The receiver of the first image then (moves to a site where the object on the first image is located) takes a second image or a video stream with a camera of said mobile camera terminal device. The second image or the video stream is displayed on a display of said mobile camera terminal device. The mobile camera terminal device, then compares said first image with said second image. If the result of that comparison indicates that a match between the first and second images fulfills predetermined conditions, said linked invisible symbols are visibly displayed on the display of said mobile camera terminal device.

The received first image serves as a kind of target image or task image, such as the wanted posters in the "wild west" served as a job offer for bounty hunters. However, the first image is the "wanted poster", the task is to photo shoot the object depicted, and the reward is the access to the hidden message.

In a simplest embodiment said, predetermined conditions are, e.g., a pixel match, wherein the first message with the revealed symbols is displayed on display.

In another example, embodiment the symbols are depicted with a "visibility" that is correlated to a matching measure between the first image and the second image. That is, in this embodiment the symbols are nearly invisible if the second image only slightly resembles the first image, and are clearly visible only if the second image strongly resembles the first image.

In yet another example, embodiment of the method of the present invention the comparing of said first and second images is performed by pixel matching, region matching, shape counting, or any combination thereof.

In just another example, embodiment of the present invention said visibly displayed linked symbols are displayed superimposed on said display in a fixed relation to said depicted second image, i.e. with a fixed relation to elements depicted on said second image. This should precisely read the visibly displayed linked symbols are displayed superimposed over the second image on said display in a fixed relation to at least significant objects in said first or source image recognized in said second image. This may be achieved by determining a perspective projection of the second image (or the 3D topography of the second image) to the first image (or its 3D topography) (or at least significant elements thereof), and a re-projection of the symbols to the second image. It may also be noted that the present invention may also use a projection module in the mobile camera terminal device to determine differences and the geometric cause of said differences between said first and second images.

It may also be possible to implement a camera position guidance system. The camera position guidance system may indicate to a user how to move the camera to reconcile the actual camera position with the camera position the first image has been taken with. The indication may be achieved by arrows depicted on the screen, or by a speech output that the user should move ½ meter to the left, lower the camera position, approach an object, and/or change the focal length of the mobile camera terminal device.

Another example embodiment of the method of the present invention further comprises sending a message that said linked invisible symbols have been visibly displayed, via a wireless connection from said mobile camera terminal device. The message may be sent to the sender of the first image.

According to yet another aspect of the invention, a software tool is provided comprising program code means for carrying out the method of the preceding description when said software tool is run on a computer or a network device.

According to another aspect of the present invention, a computer program product downloadable from a server to a readable medium for carrying out the method of the preceding description is provided, which comprises program code means for performing the steps of the client or the server of the preceding methods when said program is run on a computer or a network device.

According to yet another aspect of the invention, a computer program product is provided comprising program code means stored on a computer readable medium for carrying out the method steps of the preceding description, when said program product is run on a computer or a network device.

According to another aspect of the present invention, a computer data signal is provided. The computer data signal is embodied in a carrier wave and represents a program that makes the computer perform steps of the method contained in the preceding description, when said computer program is run on a computer, or a network device.

According to still another aspect of the invention, a mobile camera terminal device is provided. The mobile camera terminal device comprises a central processing unit, a radio interface, a storage, a display, a user input interface, an optical recording system, and a component to generate or display hidden augmented reality messages. The radio interface is for communicating via a communication network. The radio interface, the storage, the display, the user-input interface, the optical recording system, and the component to generate or display hidden augmented reality messages are all connected to said central processing unit.

The optical recording system can take first and/or second images. The user-input interface may be used to input or to provide the symbols to be hidden. The central processing unit may be configured to link symbols to taken images, such that said symbols are not visible when displaying the image on the display of the device or of another device. The display may also serve to display a second image actually taken. The radio interface may send said image and said linked invisible symbols via a wireless connection as a first image to another mobile camera terminal device. The radio interface may also receive a first image with linked invisible symbols via a wireless connection from another mobile camera terminal device.

With this configuration the device is capable of executing the methods for generating and displaying hidden augmented reality messages on said mobile camera terminal device.

The mobile camera terminal device may also be provided with a projection determination and control module, to determine the relative positions of the first and second images and to calculate the position (size orientation color . . . ) to the second image.

The mobile camera terminal device may also be provided with a dedicated module to provide symbols, as an alternative.

The radio interface may comprise a GSM/UMTS module to send said image and said linked invisible symbols are sent as a multi media message via a cellular telephone communication network.

The mobile camera terminal device may also be provided with a dedicated region of interest defining module to be able to define regions of interest in said first image, and linking information related to said regions of interest to said image.

The mobile camera terminal device may also comprise an image-processing module for pre-/post-processing, enhancement operations, color processing, or generating a virtual scene from an image taken with the optical recording system.

A watermarking (hiding or encoding) module may be provided in the mobile camera terminal device to hide (or extract) the symbols in the first image by using watermarking techniques.

The mobile camera terminal device may also comprise an image positioning module to position and orient said symbols to said first or second image.

The central processing unit of the mobile camera terminal device may be configured to compare said first and second images. It is also contemplated to use a dedicated comparison module to compare the first and second images. The mobile camera terminal device can also comprise dedicated pixel matching modules, region-matching modules, or shape counting modules connected to the central processing unit to or incorporated in a dedicated comparison module.

The display may also display said linked invisible symbols on the display of said mobile camera terminal device.

The mobile camera terminal device may also be provided with a visibility module connected to said processing unit or to a comparison unit (and maybe to the display) to control the visibility of the symbols during visibly displaying said symbols in accordance with matching measure between the first image and the second image (e.g., provided from a comparing module).

The mobile camera terminal device may also comprise a superimposer to display visibly displayed linked symbols superimposed on said first or second images displayed on the display of the mobile camera terminal device.

The radio interface (or the central processing unit) may be configured to send a message that said linked invisible symbols have been visibly displayed on said mobile camera terminal device via a wireless connection to another mobile camera terminal device.

In another example embodiment, said mobile camera terminal device comprises a mobile telephone. That is, this embodiment is a cellular telephone that is enabled to execute the method of the present invention.

BRIEF DESCRIPTION OF THE FIGURES

In the following, the invention will be described in detail by referring to the enclosed drawings in which.

DETAILED DESCRIPTION OF THE FIGURES

In the detailed description that follows, identical or similar components have been given the same reference numerals, regardless of whether they are shown in different embodiments of the present invention. In order to clearly and concisely illustrate the present invention, the drawings may not necessarily be to scale and certain features may be shown in somewhat schematic form.

Figure 1:
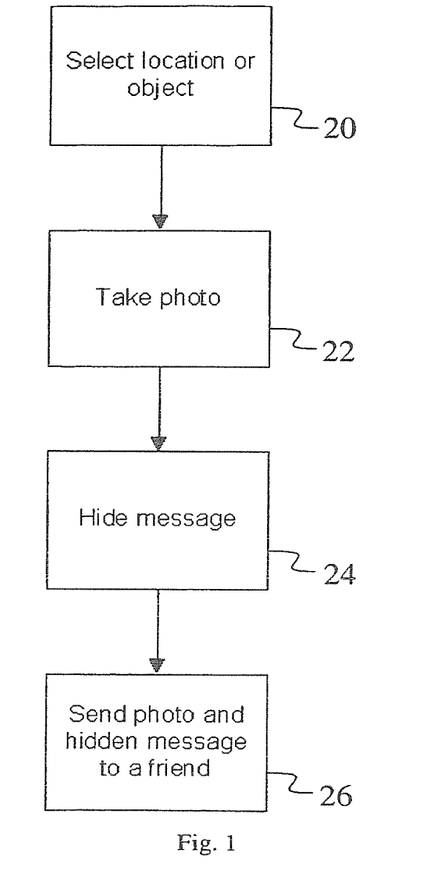
FIG. 1 presents a basic flowchart of a provider-based implementation of the invention, showing a method to hide an augmented reality message in an image.

FIG. 1 presents a basic flowchart of a provider-based implementation of the invention, showing a method to hide an augmented reality message in an image. The invention describes a new way to hide messages in an augmented reality environment. A person selects some location or object, takes a photo of it, "hides" a text message to it using, e.g., another image layer, or by re-coding the image data and text message and hiding the text message within the image data. Then the person sends the original image and the hidden message or the image data with the hidden message to his friend using, e.g., an MMS message. The mission of the receiving person is to find that exact location or a similar object, and point the location or object with the terminal camera. When the camera input is close enough to the original image, the hidden message is shown on the screen.

The principle of the invention of message hiding is depicted in FIG. 1 from sender's point of view. In the beginning, e.g., a "Person A" selects 20 some location (e.g., Eiffel tower or other major sight, central square of a city, office building, certain room) or object (e.g., license plate, traffic sign, company logo, a rare sports car) he wants to use in the game. After that, he takes a photo 22 of it using for example his mobile phone's built-in camera. It is also contemplated to use a professional multi-megapixel photo or video camera. Person A writes some kind of text message (e.g., "Meet Mr. Pink at the Colombian border at 2300 hours.") and "hides" 24 to the image by, e.g., selecting a "hide message" command from mobile phone's menu. It is also possible to implement other signs such as known trademarks or other significant and landmarks buildings or objects, it is also possible to use, e.g., telephone numbers geo coordinates or the like.

The hidden text may be regarded or may be visible, e.g., as an image layer on top of the original image. It may also be possible to hide the message/text in a layer located "behind" the picture. After this, person A sends the original image and the hidden message (as a first image) to at least one other person, e.g., his friend "Person B". This could be done using, e.g., an MMS message.

Figure 2:
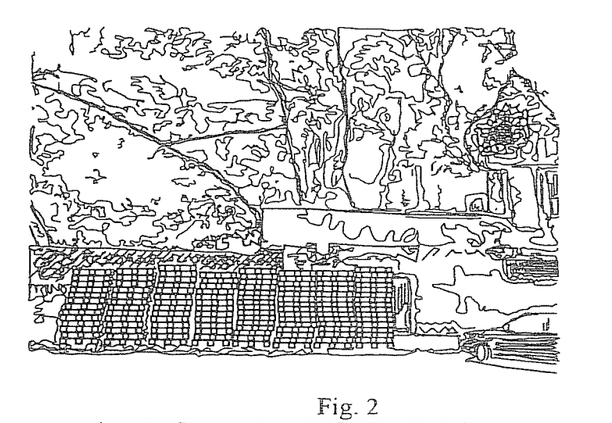
FIG. 2 presents an image that may serve to hide an augmented reality message in it.

FIG. 2 presents an image that may serve to hide an augmented reality message in it. The content or the depicted objects in the picture/image is not relevant, but should however contain some significant and at least partially unique structures. FIG. 2 depicts a church building, a colored painted rock wall a car on the right side and eight piles of euro-pallets.

Figure 3:
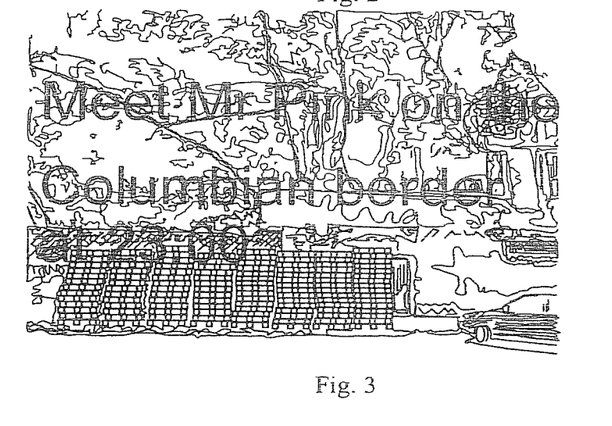
FIG. 3 depicts the image of FIG. 2 with an augmented reality message that is to be hidden in the image.

FIG. 3 shows the image of FIG. 2 with the augmented reality message "meet Mr. Pink on the Colombian border at 23:00" that is to be hidden in the image. In the picture the message is visibly depicted in a layer in front of the picture. When the message is hidden the picture again looks like FIG. 2.

Figure 4:
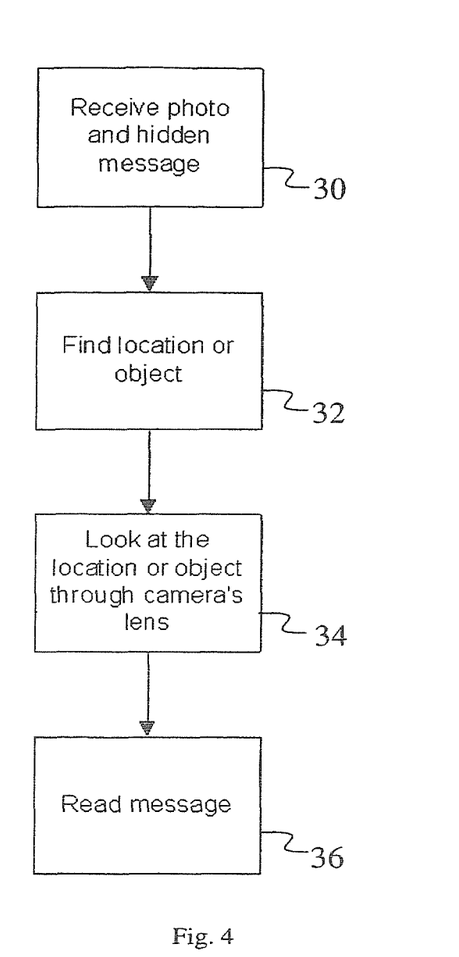
FIG. 4 presents a basic flowchart of a provider based implementation of the invention, showing a method to display a hidden augmented reality message in an image.

FIG. 4 presents a basic flowchart of a provider based implementation of the invention, showing a method to display a hidden augmented reality message in an image, from receiver's point of view.

Figure 5:
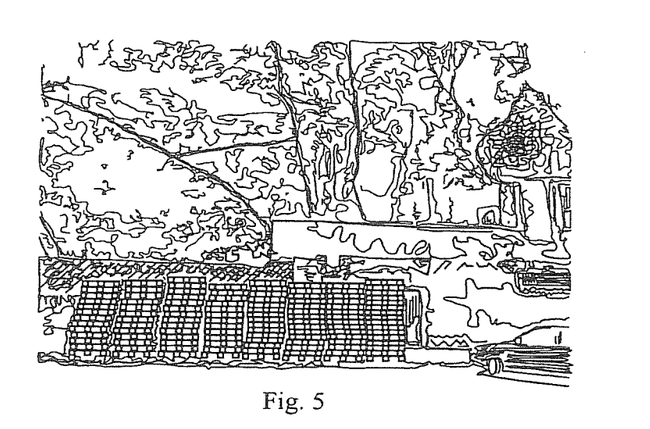
FIG. 5 depicts the (first) image of FIG. 3 with a hidden augmented reality message serving as task pattern or target image.

When Person B receives the MMS message 30, he sees only the original image as shown in FIGS. 2 and 5. His mission is to find 32 that exact location or a similar object. When this has been found, he starts looking 34 through camera's lens or viewfinder. The terminal starts to analyze camera's input and compare that to the original image.

If the camera input and the original image are totally different, the hidden message is not shown at all. If they are quite close, the message is inaccurate, too dark, or otherwise difficult to see from the terminal's screen. When the camera input and the original image are close enough, the hidden message (or a part of it) is shown on the screen, and Person B can read the message 36.

Person B could also write about finding the "cache" to the logbook just like in the case of Geocaching. Instead of a physical logbook, this could be done by sending, e.g., an SMS message to a certain telephone number or to a certain web page. In the case of a multi-player game implementation, different persons may try to find different messages and, e.g., solve a complex mission together. The hidden message could also contain an Internet address with a web-log where Person B could leave a message like in a logbook.

To make the game easier, Person A could give more detailed information about the object or location to Person B. In addition to the image and hidden message, for example text "This object can be found in Paris. It is a well-known landmark" could be sent to the receiving person. Other examples could include "This street is somewhere in Yli-Köyliö, Finland. Have a happy trip to the middle of nowhere!" and "The location of this train is a secret. If somebody finds it and reads the hidden message, he will win one thousand dollars from the Umbrella Corporation!"

Other applications are, e.g., a diary readable only when photographing a certain section of woodchip wallpaper or ingrain wallpaper. Other applications may reside in implementing a safe direction to a "letter box" as hidden and hiding place for storing operative information, Instructions, fake documents, technical and financial means etc. It is also possible to use the principle of the game as a kind of map or direction indicator, wherein all necessary information is displayed when a person is at the location. The present invention may also be used as a kind of independent tourist guide, showing additional cultural and historical information when a tourist is at the location of the landmark, building, memorial or monument of interest.

FIG. 5 shows the (first) image of FIG. 3 with a hidden augmented reality message serving as a task pattern or target picture, actually there is no difference to FIG. 2, as the message is hidden. In FIG. 5 the car seems to have another color, and therefore the figure may also depict the target area.

Figure 6:
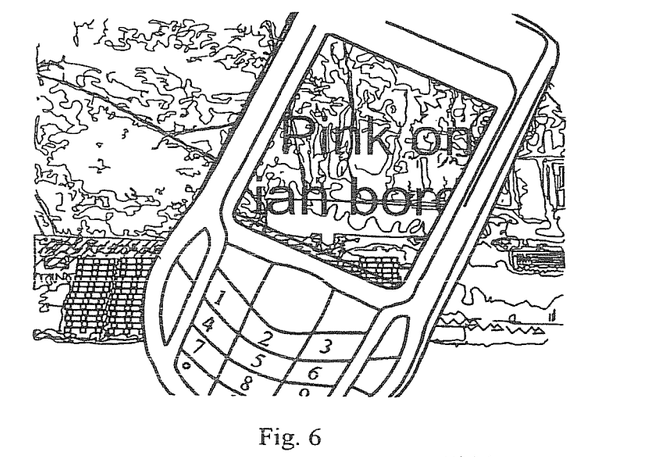
FIG. 6 shows a mobile camera phone in front of the real background, and in the display, a hidden augmented reality message is shown.

FIG. 6 shows a mobile camera phone in front of the real background, and hidden in the display the augmented reality message is shown. The real background may be recognized in that the car on the right side has left. In the display of the phone the part of the hidden augmented reality message is visible. Due to the highly sophisticated embodiment of the mobile telephone, the message is depicted in the size font position and orientation of the message person A has hidden it in the first picture.

In simpler embodiments it may be possible to simply display the message in a part of the display of the mobile telephone. It is also possible to just display the whole first image with the visible augmented reality message in the display, which may be useful for reasons of power savings.

Figure 7:
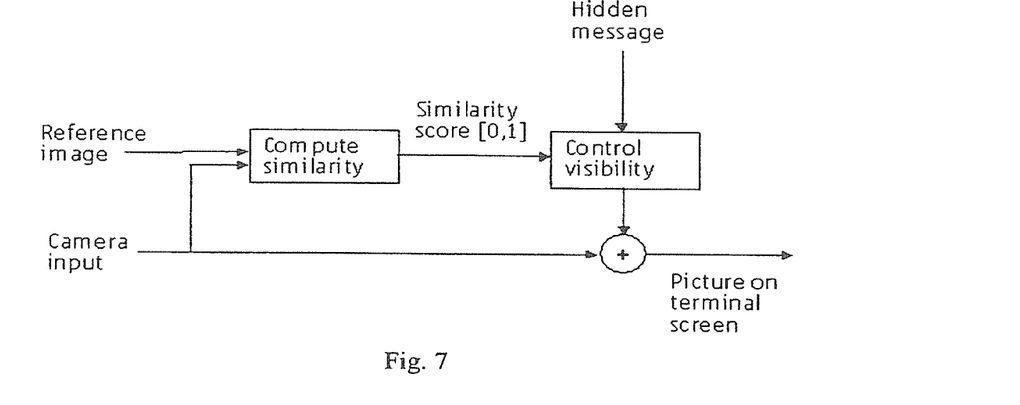
FIG. 7 shows an flowchart/a schematic diagram of a simple embodiment of a method/device to display an augmented reality message hidden in an image, FIG. 8 schematically shows, how different respective positions determine the position and orientation of a hidden augmented reality message to be displayed superimposed on a current scene captured.

FIG. 7 shows a schematic diagram of a simple embodiment of a method/device to display an augmented reality message hidden in an image and for matching the camera input image with the reference image, and determining the visibility of the hidden message. The block diagram implements a simple version of matching the camera image with the reference image. The similarity score controls the degree of visibility of the hidden message, which is superposed on the camera image and the result is shown on the terminal screen. When the reference image and camera input match perfectly, the hidden message is completely visible.

The analysis algorithms could be based on comparing features like edges and regions, average color of the whole image, certain regions, average brightness and contrast, correlation, and so on.

Figure 8:
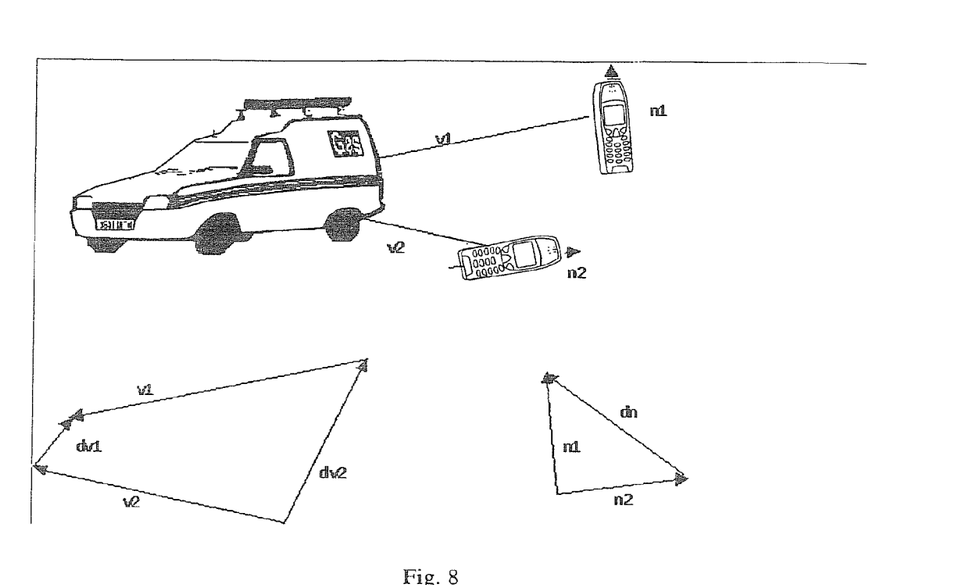

FIG. 8 schematically shows, how different respective positions for determining the position and orientation of a hidden augmented reality message to be displayed superimposed on a current scene captured. In practice the camera position and orientation will differ from the ones used in taking the original reference image, see FIG. 6. These differences need to be compensated when calculating the similarity. The similarity estimation block will return estimates of the difference to the original camera location (n1, n2, and dn.), and these can be used to project the original hidden text on the current camera view such that it corresponds to the original position in the original image. This way, e.g., a text written on the side of a car will appear to be written on the side of the car instead of "floating in the air". Otherwise, if it is intended to use floating in the air text the invention maybe used to ensure that the text is actually "floating". It is also envisaged to implement an automatic focal length compensator module.

It may also be envisaged to perform an environmental three-dimensional scan by using an autofocus that scans all focal lengths and identifies the three dimensional structure from the regions of the images that are in focus.

A similar approach may be used to avoid mismatches between the pictures that are caused by different focal lengths of the device taking the first picture and the device taking the second picture. It may be possible to encode the focal length in the first picture. A three-dimensional environment with an objective having a focal length of 35 mm is quite different to the same scene taken with an objective having a 125-mm focal length. It is, for example, possible to use an IMEI (International Mobile Equipment Identificator) request in a game server to select a specific source image or "target image" taken with an optical device having a suitable focal length.

The simple system of FIG. 7 ignores this compensation for the user display. Thus, in a simple implementation one could just do some level of compensation, e.g., for the rotation and distance in the similarity calculation, but ignore the compensation in the display made for the user.

Figure 9:
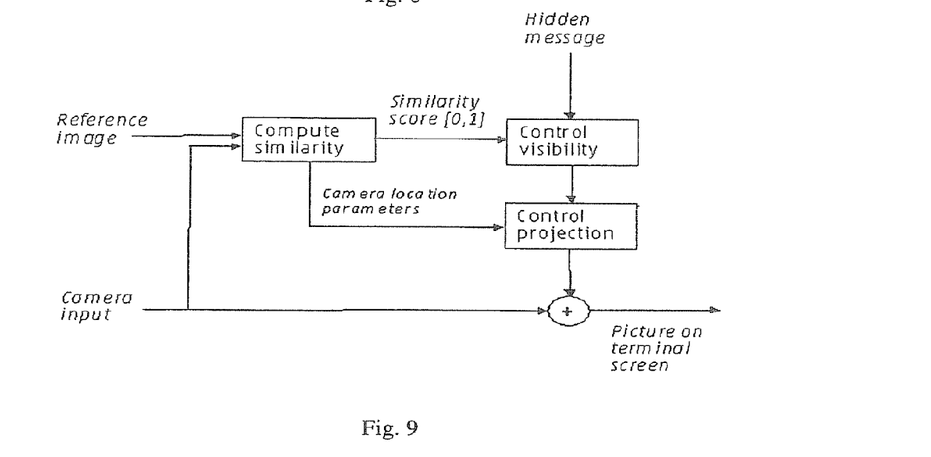
FIG. 9 shows the flowchart of FIG. 7 extended to displaying the hidden augmented reality message in according to the position and orientation of the augmented reality message hidden in the first image.

FIG. 9 shows the flowchart of FIG. 7 extended to displaying the hidden augmented reality message according to the position and orientation of the augmented reality message hidden in the first image. FIG. 9 shows a block diagram where the similarity calculation process returns estimates for the shift in camera location, and these parameters are used to project the hidden message such that its position corresponds to the one it had in the original image. Thus, when the user now moves the camera around the supposed original object, the message remains fixed on top of the object, but its visibility changes as the match improves.

FIG. 7 shows the principle of matching the camera image input with the reference image, and determining the visibility of the hidden message. In FIG. 9 the principle is extended to derive or calculate from the similarity computation an estimation of the camera location which is used to do a 3D perspective projection to the hidden text such that the text is projected to its original place in the first image.

Figure 10:
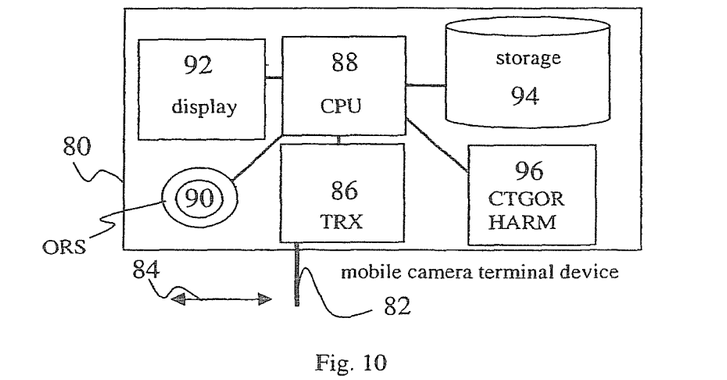
FIG. 10 shows an embodiment of a mobile camera terminal device that can be used to execute the method of the present invention.

FIG. 10 shows an embodiment of a mobile camera terminal device that can be used to execute the method of the present invention. The depicted terminal device 80 is embodied as a mobile wireless network camera terminal device. The air or radio interface (TRX) 86 can communicate 84 via an antenna 82 with a communication network (not shown). The radio interface 86 to the communication network is connected to a central processing unit (CPU) 88 of the mobile wireless network terminal device 80. In this embodiment, the CPU is connected to a storage 94, an optical recording system (ORS) 90 (i.e. a lens system with a CCD (Charge coupled device) or CMOS chip) and a display 92 acting as a viewfinder and a display. With the interface 86, the device can receive first images and store them in one of the storage 94. The device can take second images via the optical recording system 90 and store them in the storage 94. The terminal device 80 can also be configured to display received first images and the actual field of view simultaneously on the display 92 by using cross fading techniques provided by said CPU 88. The mobile camera terminal device can also be provided with a component to generate or read hidden augmented reality messages (CT-GOR HARM) 96 to generate first images with hidden augmented reality messages, i.e. augmented reality message hiding and to read or display hidden augmented reality messages on a display when certain predefined conditions are fulfilled.

Figure 11:
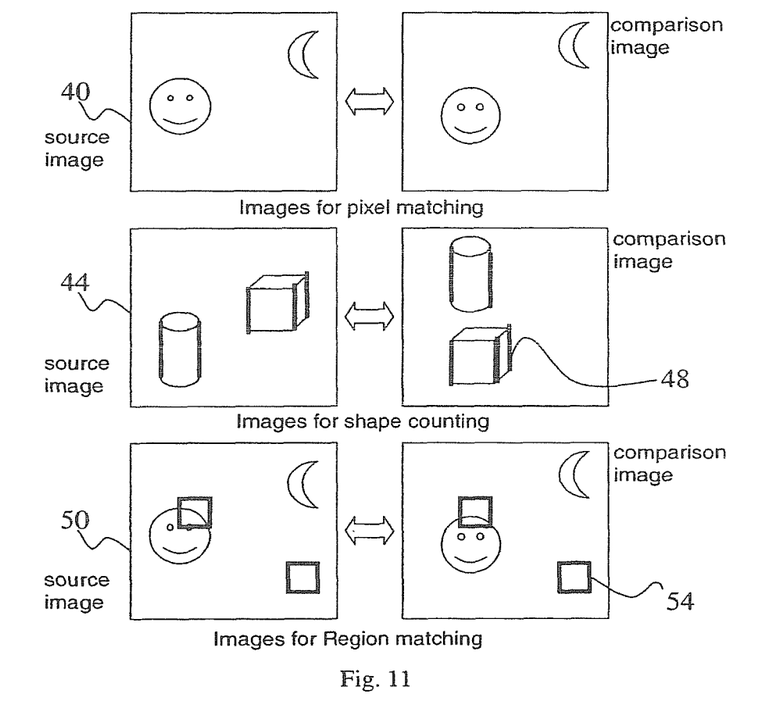
FIG. 11 presents some different matching criteria.

FIG. 11 presents some different matching criteria. The party generating the first image may pick the matching criteria to be used, according to, e.g., the picture/image parameters, the depicted objects or the structure depicted in the image. Alternatively, the criteria are chosen randomly when the first image is generated. The criteria can include almost any image processing operations: 1) pixel matching 40 of a) the whole image, b) parts of the image, or c) any block to any block, 2) pattern matching 44 (of the number)

of a) certain features like edges 48 or smooth areas; b) certain detected shapes or objects and 3) transform matching 50 of a) transformed images or b) parts 54 of a transform of whole or part of the image. More specifically and as an example only, colors, ornaments, geometric shapes, faces, vehicles, license plates, or other object shapes may be used as matching criteria, and not the whole image.

When it is determined if the second image matches the first image, various match-scoring schemes may be used. However it is also possible to implement organizer based games wherein a person or a number of persons are provided with a number of images to play, public paper chases. The use of public events with a nearly unrestricted number of participants may serve to make the game public and known so that the paper chase feature has a chance of becoming a criterion for buying, e.g., a mobile telephone. A score may be derived directly from a kind of race type match. For rewarding, the scores can then be converted to monetary units or virtual credits used in many services. To boost the game, movie theatres or such may give out free tickets for the best players, in a paper chase game to all cinemas of town. A similar approach may be used for a paper chase to all fast food restaurants in town. In both cases a start image may indicate the starting point of the chase, and the revealed information may comprise a telephone number required to download a next first image, for a next target. In such arrangements it is also possible to send the challenge images out centrally, whereby they can be related to the event being promoted. A group of people may engage in a contest against each other according to a theme, and one of the registered players may win a free entrance or some other bonus, while the others just get the excitement.

The present invention can provide a new game functionality that may promote user creativity in mobile gaming and entertainment by opening infinitely many ways to modify and vary the gaming experience.

This invention can enable a very attractive gaming application for camera-equipped gaming terminals.

The invention can also be used for marketing purposes. A Company selling sports cars may send an image of a new, breathtaking sports car to its customers. By coming to the store and photographing the car, the customer could reveal hidden messages such as "Special offer: A free steep heavy metal CD for all buyers of this new car model!"

In the game course, cheating may be circumvented by a respective online implementation of the game. An online game has the additional advantage that a user may be charged for every online data transfer. Another advantage of an online game is that the text may only be transferred when a match is detected, that is there is no way to extract the "hidden text" from the first image. The game idea is a strict match/no match strategy. Therefore it could be envisaged to implement an "error" such as a stone, a gap, a crack an additional branch, a dog, or other "inadvertent" creatures or objects on a photo. If there is a match in the "inadvertent component," that can indicate that the user used a cheat to obtain to the image. This may be implemented, for example, as a similarity threshold that should not be exceeded to score. The image may also contain a void area that is, e.g., grayed out, i.e., the image does not show all the image parts that have to match. However, in this embodiment the image the user has taken has to match with a reference image in all areas. Thus, a cheater would have to invent the grey area, if he did not take a picture on the correct site. This simple restriction may serve to filter a number of cheaters that may be rewarded with negative scores.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

What is claimed is:

1. A method comprising:
   receiving a first image of an object;
   receiving at least one symbol; and
   processing the first image and the at least one symbol,
   wherein the at least one symbol is embedded as an invisible watermark in the first image,
   wherein, if the first image is compared with a second image, the watermark is extractable from the first image and displayable with a degree of visibility based on a degree of similarity of the second image to the first image.

2. A method of claim 1, further comprising:
   transmitting the first image; and
   transmitting the at least one symbol.

3. A method of claim 2, wherein at least one of the receiving and the transmitting is via one of a wireless connection, a wired network connection, a cellular telephone communications network and a combination thereof.

4. A method of claim 1, wherein the first image and the at least one symbol are linked as they are received.

5. A method of claim 4, wherein a linkage of the at least one symbol to the first image includes a defined position of the at least one symbol in relation to a location within the first image, wherein the first image includes defined regions of interest in the first image and information relating the regions of interest to the first image.

6. A method of claim 2, wherein the first image and the at least one symbol are linked when they are transmitted.

7. A method of claim 1, further comprising:
   receiving the second image from a camera.

8. A method of claim 1, wherein at least one of the receiving and the processing occur through at least one of a server, a mobile device and a combination thereof.

9. An apparatus comprising:
   at least one processor; and
   at least one memory including computer program code for one or more programs,
   the at least one memory and the computer program code configured to, with the at least one processor, cause the apparatus to perform at least the following,
   process and/or facilitate a processing of a first image of an object and at least one symbol to extract an invisible watermark of the least one symbol embedded in the first image,
   compare the first image with a second image to determine a degree of similarity between the first image and the second image,
   determine a degree of visibility for the watermark based on the determined degree of similarity, and
   display the watermark with the determined degree of visibility.

10. An apparatus of claim 9, wherein the apparatus is further caused to:
   transmit the first image, and
   transmit the at least one symbol.

11. An apparatus of claim 10, wherein the first image, the at least one symbol, or a combination thereof is transmitted or received via one of a wireless connection, a wired network connection, a cellular telephone communications network and a combination thereof.

12. An apparatus of claim 9, wherein the apparatus is further caused to:
   receive the second image from a camera.

13. An apparatus of claim 12, wherein a linkage of the at least one symbol to the first image includes a defined position of the at least one symbol in relation to a location within the first image, wherein the first image includes defined regions of interest in the first image and information relating the regions of interest to the first image.

14. An apparatus of claim 10, wherein the first image and the at least one symbol are linked when they are transmitted.

15. An apparatus of claim 9, wherein the first image includes defined regions of interest in the first image and information relating the regions of interest to the first image.

16. An apparatus of claim 9, wherein the apparatus is at least one of a server, a mobile device and a combination thereof.

17. A system comprising:
   a first device configured to:
      create a first image of an object,
      create at least one symbol, and
      embed the at least one symbol in the first image as an invisible watermark in the first image; and
   a second device configured to:
      receive the first image and the at least one symbol,
      process and/or facilitate a processing of the first image and the at least one symbol to extract an invisible watermark of the least one symbol embedded in the first image;
      compare the first image with a second image to determine a degree of similarity between the first image and the second image,
      determine a degree of visibility for the watermark based on the determined degree of similarity, and
      display the watermark with the determined degree of visibility.

18. A system of claim 17, wherein the second device is further configured to transmit the first image, the at least one symbol, or a combination thereof.

19. A system of claim 18, wherein a linkage of the at least one symbol to the first image includes a defined position of the at least one symbol in relation to a location within the first image, wherein the first image includes defined regions of interest in the first image and information relating the regions of interest to the first image.

20. A system of claim 19, wherein the second device is further configured to create the linkage when the second device receives the first image and the at least one symbol from the first device.

\* \* \* \* \*